(12) United States Patent
Kim et al.

(10) Patent No.: US 9,524,586 B2
(45) Date of Patent: Dec. 20, 2016

(54) METHOD OF PROVIDING AUGMENTED REALITY AND TERMINAL SUPPORTING THE SAME

(71) Applicant: Samsung Electronics Co., Ltd., Gyeonggi-do (KR)

(72) Inventors: Heewoon Kim, Gyeonggi-do (KR); Jiyoung Kang, Gyeonggi-do (KR); Kyunghwa Kim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 389 days.

(21) Appl. No.: 13/738,288

(22) Filed: Jan. 10, 2013

(65) Prior Publication Data

US 2013/0182012 A1   Jul. 18, 2013

(30) Foreign Application Priority Data

Jan. 12, 2012 (KR) .......................... 10-2012-0003798

(51) Int. Cl.
*G09G 5/14* (2006.01)
*G06T 19/00* (2011.01)

(52) U.S. Cl.
CPC .................... *G06T 19/006* (2013.01)

(58) Field of Classification Search
CPC ................................................ G06T 19/006
USPC ........................................................ 345/633
See application file for complete search history.

(56) References Cited

U.S. PATENT DOCUMENTS

| 6,307,568 | B1* | 10/2001 | Rom ...................... G06T 19/00 345/629 |
| 6,559,870 | B1* | 5/2003 | Anabuki et al. ............... 715/849 |
| 6,597,410 | B1* | 7/2003 | Doany et al. .................. 348/744 |
| 7,295,697 | B1* | 11/2007 | Satoh .................... G06T 7/0071 382/154 |
| 2002/0057280 | A1* | 5/2002 | Anabuki et al. .............. 345/633 |
| 2002/0069013 | A1* | 6/2002 | Navab .................... G01C 21/20 701/522 |
| 2002/0094189 | A1* | 7/2002 | Navab .................... H04N 19/27 348/207.99 |
| 2002/0095265 | A1* | 7/2002 | Satoh et al. .................... 702/94 |
| 2002/0103617 | A1* | 8/2002 | Uchiyama et al. ........... 702/150 |
| 2002/0126895 | A1* | 9/2002 | Satoh ........................... 382/190 |
| 2002/0167536 | A1* | 11/2002 | Valdes et al. ................. 345/633 |
| 2003/0032484 | A1* | 2/2003 | Ohshima ................ A63F 13/10 463/43 |

(Continued)

FOREIGN PATENT DOCUMENTS

JP        05304646 A   * 11/1993
JP     2001013941 A   *  1/2001

(Continued)

*Primary Examiner* — Javid A Amini
(74) *Attorney, Agent, or Firm* — Cha & Reiter, LLC (57) ABSTRACT

A method of providing augmented reality and a terminal supporting the same are provided. The terminal for supporting augmented reality includes: a display unit displaying a specific image during a preview image mode; and a controller recognizing at least one surface from the specific image according to a predetermined criteria, combining an image of a virtual object with the specific image so that the image of a virtual object is displayed on the recognized at least one surface, and controlling the display unit to output the combined image.

19 Claims, 5 Drawing Sheets

(56) References Cited

U.S. PATENT DOCUMENTS

| | | | |
|---|---|---|---|
| 2003/0080975 A1* | 5/2003 | Kuroki et al. | 345/629 |
| 2003/0080976 A1* | 5/2003 | Satoh et al. | 345/629 |
| 2003/0080978 A1* | 5/2003 | Navab et al. | 345/633 |
| 2003/0080979 A1* | 5/2003 | Satoh et al. | 345/633 |
| 2003/0137524 A1* | 7/2003 | Anabuki et al. | 345/633 |
| 2003/0182072 A1* | 9/2003 | Satoh et al. | 702/95 |
| 2004/0066417 A1* | 4/2004 | Anabuki et al. | 345/848 |
| 2004/0090444 A1* | 5/2004 | Satoh | 345/633 |
| 2004/0133379 A1* | 7/2004 | Kobayashi et al. | 702/127 |
| 2004/0176925 A1* | 9/2004 | Satoh et al. | 702/150 |
| 2005/0008256 A1* | 1/2005 | Uchiyama et al. | 382/291 |
| 2005/0069174 A1* | 3/2005 | Uchiyama et al. | 382/103 |
| 2005/0123171 A1* | 6/2005 | Kobayashi | G06F 3/011 382/103 |
| 2005/0159916 A1* | 7/2005 | Anabuki | 702/151 |
| 2005/0234333 A1* | 10/2005 | Takemoto et al. | 600/426 |
| 2005/0253870 A1* | 11/2005 | Kotake et al. | 345/633 |
| 2005/0253871 A1* | 11/2005 | Anabuki et al. | 345/633 |
| 2005/0256395 A1* | 11/2005 | Anabuki et al. | 600/414 |
| 2005/0261573 A1* | 11/2005 | Satoh et al. | 600/415 |
| 2006/0071946 A1* | 4/2006 | Anabuki et al. | 345/633 |
| 2007/0024644 A1* | 2/2007 | Bailey | 345/633 |
| 2007/0035562 A1* | 2/2007 | Azuma et al. | 345/633 |
| 2007/0125862 A1* | 6/2007 | Uchiyama et al. | 235/462.09 |
| 2007/0233852 A1* | 10/2007 | Jachner | G06Q 10/109 709/224 |
| 2007/0282695 A1* | 12/2007 | Toper | G06Q 30/0603 705/26.81 |
| 2008/0228422 A1* | 9/2008 | Satoh | 702/92 |
| 2008/0284864 A1* | 11/2008 | Kotake et al. | 348/222.1 |
| 2009/0089186 A1* | 4/2009 | Paolini | G06Q 10/0637 705/26.1 |
| 2009/0244097 A1* | 10/2009 | Estevez | G06F 1/1613 345/633 |
| 2010/0185529 A1* | 7/2010 | Chesnut et al. | 705/27 |
| 2010/0194782 A1* | 8/2010 | Gyorfi et al. | 345/633 |
| 2010/0287500 A1* | 11/2010 | Whitlow et al. | 715/810 |
| 2010/0309225 A1* | 12/2010 | Gray et al. | 345/633 |
| 2011/0110594 A1* | 5/2011 | Hasegawa | G06T 7/004 382/190 |
| 2011/0161875 A1* | 6/2011 | Kankainen | G06F 3/0481 715/810 |
| 2011/0234619 A1* | 9/2011 | Tokunaga | G02B 26/101 345/589 |
| 2012/0019557 A1* | 1/2012 | Aronsson | G06T 11/00 345/633 |
| 2012/0058801 A1* | 3/2012 | Nurmi | 455/566 |
| 2012/0113140 A1* | 5/2012 | Hilliges | G06F 3/012 345/633 |
| 2012/0113141 A1* | 5/2012 | Zimmerman | G06Q 30/0643 345/633 |
| 2012/0176411 A1* | 7/2012 | Huston | G06Q 50/01 345/633 |
| 2012/0218423 A1* | 8/2012 | Smith | G06Q 30/02 348/207.1 |
| 2013/0021373 A1* | 1/2013 | Vaught et al. | 345/633 |
| 2013/0050258 A1* | 2/2013 | Liu et al. | 345/633 |
| 2013/0108121 A1* | 5/2013 | de Jong | G06K 9/00 382/111 |
| 2013/0124326 A1* | 5/2013 | Huang et al. | 705/14.64 |
| 2013/0135344 A1* | 5/2013 | Stirbu | G06F 17/30893 345/629 |
| 2013/0162673 A1* | 6/2013 | Bohn | G02B 27/0172 345/633 |
| 2013/0178257 A1* | 7/2013 | Langseth | 463/4 |
| 2013/0325912 A1* | 12/2013 | Corrie | G06F 12/0253 707/813 |

FOREIGN PATENT DOCUMENTS

| | | |
|---|---|---|
| JP | 3406965 B2 | 3/2003 |
| JP | 2010145436 A * | 7/2010 |
| JP | 2013164737 A * | 8/2013 |

* cited by examiner

METHOD OF PROVIDING AUGMENTED REALITY AND TERMINAL SUPPORTING THE SAME

CLAIM OF PRIORITY

This application claims the benefit under 35 U.S.C. §119(a) of a Korean patent application filed on Jan. 12, 2012 in the Korean Intellectual Property Office and assigned Serial No. 10-2012-0003798, the entire disclosure of which is hereby incorporated by reference.

BACKGROUND OF THE INVENTION

Field of the Invention

The present invention relates to a method of providing augmented reality and a terminal supporting the same.

Description of the Related Art

A portable terminal supports various functions based on mobility and widely used in many fields due to utility convenience and easy portability.

Such a portable terminal has a specific function module to support various user functions. For example, the portable terminal may include a camera module for an image collecting function. In particular, the portable terminal having the camera module supports a preview function outputting image collected through the camera module on a display unit, and a storage function storing images collected according to a user request.

In recent years, a number of different technologies associated with using a camera module has been developed, for example, augmented reality which is a live, direct or indirect, view of a real-world environment whose elements are augmented by computer-generated sensory input. More specifically, augmented reality combines a real environment with virtual objects, and adds virtual reality to real-world images using a graphic technology.

However, the current portable terminal simply combines virtual object images without separating solidity of a real-world object when providing the augmented reality. Particularly, since the current portable terminal simply combines virtual objects without separating a boundary or a step between real-world objects, the reality of an image to which augmented reality is applied is significantly deteriorated and lacks an optimal viewer perspective. Thus, there is a need for an improved scheme to enhance the augmented reality so that a user is presented with a pleasing simulation of events.

SUMMARY OF THE INVENTION

The present invention has been made in view of the above problems and provides additional advantages, by providing a method of providing augmented reality by recognizing a surface of a subject from a preview image such that a virtual object is arranged on the recognized surface of the subject for display, thereby enhancing the viewing experience.

In accordance with an aspect of the present invention, a method of providing augmented reality includes: acquiring a specific image from a subject being viewed or imaged; and recognizing a surface of the subject for arranging a virtual object thereon from the specific image.

In accordance with another aspect of the present invention, a terminal for supporting augmented reality includes: a display unit displaying a specific image during a preview image mode; and a controller recognizing at least one surface from the specific image according to a predetermined criteria, combining an image of a virtual object with the specific image so that the image of a virtual object is displayed on the recognized at least one surface, and controlling the display unit to output the combined image.

BRIEF DESCRIPTION OF THE DRAWINGS

The above features and advantages of the present invention will be more apparent from the following detailed description in conjunction with the accompanying drawings, in which.

DETAILED DESCRIPTION OF EXEMPLARY EMBODIMENTS

Hereinafter, exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

Briefly, the present invention provides augmented reality with an enhanced reality by combining real object images with virtual object images such that virtual objects are arranged and displayed on the real objects according to a number of criteria. To this end, the present invention is characterized that it analyzes at least one of a color, edges, and a shadow from a specific image, for example, a preview image which a subject of a real-world is viewed or imaged to recognize a surface of the subject ideal to display a virtual object. The present invention is characterized that it changes or modifies the virtual object to be accommodated on the subject for enhanced viewing or displaying experience.

In the present invention, the virtual object is an object expressed by 2D or 3D images. The virtual object may be associated with a specific event, for example, images, schedules, and a terminal state alarm event. Thus, the virtual object may be an object indicating information associated with a subject to be arranged. For example, if the subject is a specific place, the virtual object may be travel information associated therewith or the subject may be private information associated with a specific person.

Figure 1:
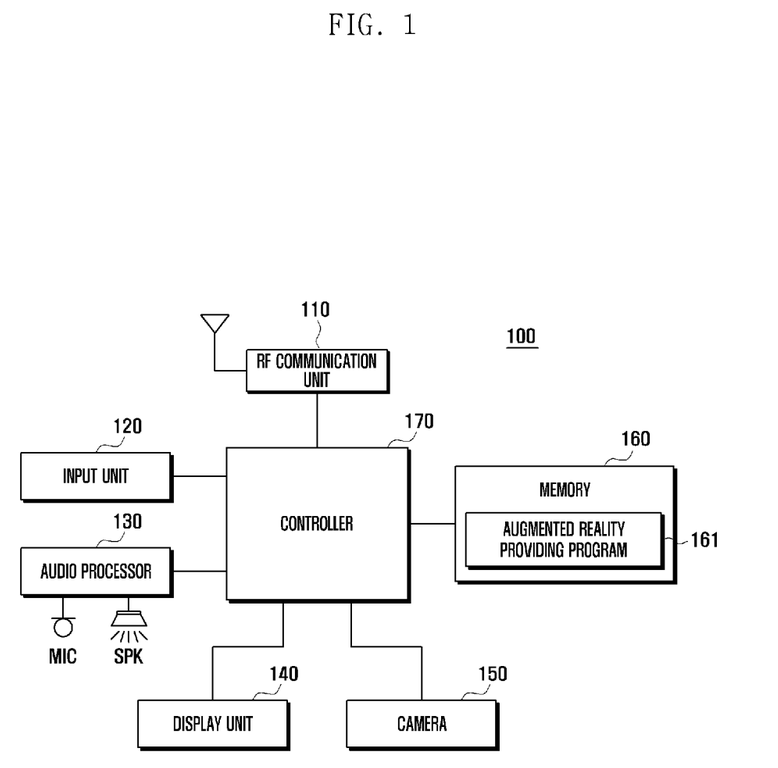
FIG. 1 is a block diagram illustrating a configuration of a terminal according to an exemplary embodiment of the present invention.

FIG. 1 is a block diagram illustrating a configuration of a terminal according to an exemplary embodiment of the present invention. The terminal of the present invention may include an electronic device or mobile terminal, such as a portable phone, a Portable Multimedia Player (PMP), a digital broadcasting player, a Personal Digital Assistant (PDA), a music file player (e.g., MP3 player), a portable game terminal, a tablet PC, and a smart phone. For illustrative purposes, the following description will be made assumption that the present invention is implemented in the smart phone for convenience of the description.

Referring to FIG. 1, the terminal 100 according to an embodiment of the present invention includes a radio frequency (RF) communication unit 110, an input unit 120, an audio processor 130, a display unit 140, a camera 150, a memory 160, and a controller 170.

The RF communication unit 110 forms a communication channel for voice call, a communication channel for image call, and a communication channel (referred to as 'data communication channel') for transmitting images or message under control of the controller 170. Particularly, the RF communication unit 110 of the present invention may transmit a message for requesting an image analysis according to an embodiment of the present invention through a data communication channel and receive an image analysis result responsive to the request. For example, the RF communication unit 110 may transmit a message for requesting an analysis with respect to at least one of an augmented reality target image, a color, edges, and a shadow of a subject to a specific server under the control of the controller 170. In response, the RF communication unit 110 may receive an augmented reality target image analysis result from the specific server. Accordingly, the controller 170 may recognize a surface of the subject using the reference of the analysis result. The RF communication unit 110 of the present invention may receive an image entered by a user or from another external source for adding augmented reality or a virtual object image for providing the augmented reality through the data communication channel.

The input unit 120 receives various character information and transfers a signal inputted associated with setting various functions and function control of the terminal 100 to the controller 170. The input unit 120 may be configured by one of a touch pad, a key pad of general key arrangement, and a key pad of QWERTY type, or a combination thereof. The input unit 120 may further include function keys such as arrow keys, volume keys, and hot keys set to perform specific functions. In particular, the input unit 120 of the present invention may generate an augmented reality providing request signal generated by the user. To this end, the input unit 120 of the present invention may generate a selection signal for selecting an augmented reality target image and a virtual object image. Further, the input unit 120 may generate a selection signal with respect to a scheme of recognizing a surface of a subject in the augmented reality target image. Here, a user may select whether to recognize a surface of a subject using certain analysis elements or certain combination of a color, edges, and a shadow. Accordingly, the controller 170 may receive a signal with respect to selection of a surface recognition scheme and analyze an augmented reality target image in order to recognize a surface of the subject. The controller 170 may include a brightness analysis unit to determine the brightness of image. The input unit 120 may generate an input signal setting such that the augmented reality providing program is automatically executed when an image photographing function is executed.

The audio processor 130 includes a speaker SPK for playing transmitted/received audio data during call, audio data included in received messages, and audio data according to playback of an audio file stored in the memory 160 and a microphone MIC for collecting a voice of the user or other audio signals during the call. Particularly, if an image to which augmented reality is applied is outputted, the audio processor 130 of the present invention may output a corresponding effect sound. The effect sound may be omitted according to the user setting.

The display unit 140 displays information inputted by the user or information provided to the user as various screens according to the operation of the terminal 100. In particular, the display unit 140 of the present invention outputs an augmented reality target image, and outputs an augmented reality application image, which may be a combination of the augmented reality target image and a virtual object image. For example, the display unit 140 may provide realistic augmented reality by outputting an augmented reality application image so that a virtual object is arranged on a subject in the augmented reality target image under control of the controller 170. As a surface of the subject is recognized in the augmented reality target image, the display unit 140 of the present invention may highlight and display the recognized surface. The display unit 140 supports a 2D graphics technology or a 3D graphics technology.

The camera 150 is activated under control of the controller 170, and provides various camera functions and supports functions related to an augmented reality according to the embodiment of the present invention. The camera 150 may include a camera sensor converting an optical into an electric signal, an image signal processor converting an analog video signal into a digital video signal, and a digital signal processor image-processing (scaling, noise removal, RGB signal conversion) a video signal outputted from the image signal processor to display the video signal on the display unit 140. Here, the camera sensor may include a CCD sensor or a CMOS sensor, a configuration of the image signal processor (not shown) may be implemented by a DSP. Particularly, the camera 150 of the present invention may photograph a subject to generate a preview image and store the photographed preview image in the memory 160. The controller 170 may use the preview image as an augmented reality target image according to the embodiment of the present invention.

The memory 160 stores at least one application necessary in a function operation according to the embodiment of the present invention, user data generated by the user, messages transmitted/received with a network, and data according to execution of the application. The memory 160 may chiefly include a program area and a data area.

The program area may store an operating system (OS) for booting the terminal 100 and for operating respective constituent elements, and downloaded and installed applications. Particularly, the program area of the present invention stores an augmented reality providing program 161.

The augmented reality providing program 161 includes routines which recognize a surface of a subject from the augmented reality target image to arrange and display the virtual object on the recognized surface of the subject.

Particularly, the augmented reality providing program 161 according to the embodiment of the present invention includes a routine of acquiring an augmented reality target image, a routine of analyzing at least one of a color, edges, and a shadow from the augmented reality target image to recognize a surface of a subject, a routine of combining the augmented reality target image with a virtual object image to generate the augmented reality application image such that a virtual object is arranged and displayed on the recognized surface, and a routine of outputting the augmented reality application image. Meanwhile, the surface recognizing routine and a routine of generating the augmented reality application image will be described in detail with reference to FIGS. 4 and 5.

The data area is an area which store data generated according to use of the terminal 100. In particular, the data area of the present invention stores data used or generated during an execution of the augmented reality providing program 161. For instance, the data area may store the augmented reality target image, the virtual object image, a combined augmented reality application image of the augmented reality target image and the virtual object image, and a surface recognition scheme.

The controller 170 controls an overall operation of the terminal 100. Particularly, the controller 170 of the present invention may recognize a surface of a subject from the augmented reality target image, for example, a preview image, and arranges and displays a virtual object on the recognized surface, thereby controlling an operation associated with the augmented reality. For example, the controller 170 analyzes at least one of a color, edges, and a shadow from the augmented reality target image to recognize a surface of the subject. Then, the controller 170 combines the augmented reality target image and a virtual object image to generate an augmented reality application image such that a virtual object is arranged and displayed on the recognized surface. The controller 170 controls a display unit 140 to display the generated augmented reality application image so that a more realistic augmented reality may be provided. Because the controller 170 supports a virtual object indicating information associated with a particular subject to be expressed in the form of more informative augmented reality, an improved information transfer effect may be provided to the users or more interest elements may be added to enhance the augmented reality experience. To do this, the controller 170 may include constituent elements as shown in FIG. 2.

Figure 2:
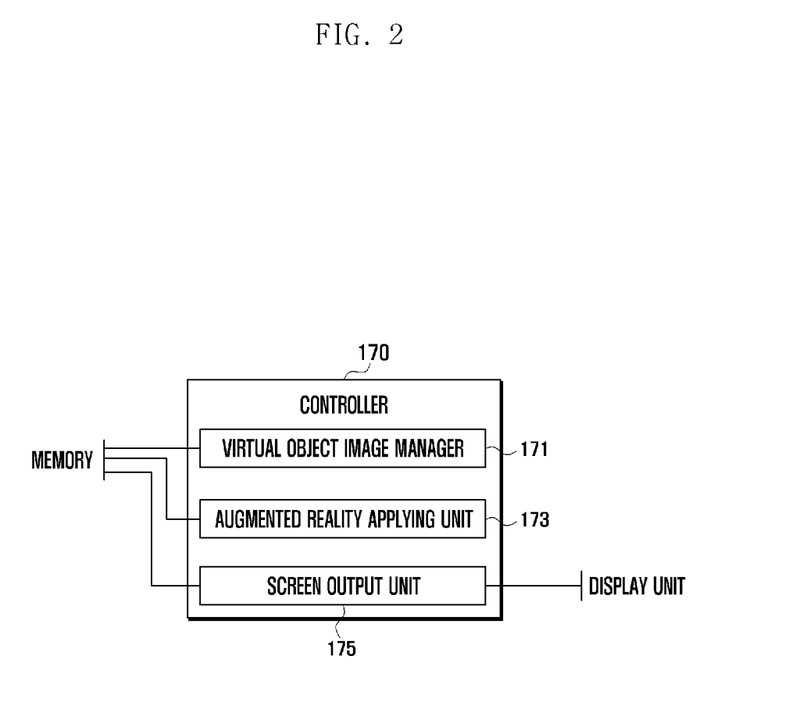
FIG. 2 is a block diagram schematically illustrating a configuration of a controller shown in FIG. 1.

FIG. 2 is a block diagram schematically illustrating the configuration of a controller 170 shown in FIG. 1.

Referring to FIG. 2, the controller 170 of the present invention includes a virtual object image manager 171, an augmented reality applying unit 173, and a screen output unit 175.

In operation, the virtual object image manager 171 generates augmented reality by changing a virtual object image to be arranged and displayed as a mixture of a virtual object and a specific live, direct or indirect, view of a physical, real-world environment (i.e., the augmented reality target image). To this end, the virtual object image manager 171 may create a virtual object according to a specific event and generate an image appropriate to a particular event. Here, the virtual object image manager 171 may select the virtual object according to a user's selection or an alarm event such as messages, a schedule, and a state of the terminal 100.

The virtual object image manager 171 may further change the image of the virtual object by changing an arranged structure of the virtual object. For example, the virtual object image manager 171 may reduce, enlarge, 2D-rotate, 3D-rotate, or cut the virtual object, or add another virtual object, such as speech bubble, to the virtual object to change or modify the whole appearance of the virtual object. Accordingly, the virtual object image manager 171 may change or modify the size of a contact part with a subject where the virtual object image will be arranged.

The augmented reality applying unit 173 combines the augmented reality target image with the virtual object image to great the augmented reality. In detail, the augmented reality applying unit 173 analyzes at least one of a color, a edge, and a shadow of a subject from the augmented reality target image to recognize at least one surface where the virtual object can be arranged. The augmented reality applying unit 173 may control the RF communication unit 110 to request vicarious execution of the analysis operation to a specific server. The augmented reality applying unit 173 combines the virtual object image with the augmented reality target image to generate the augmented reality application image. Here, the augmented reality applying unit 173 combines the images as if the virtual object is arranged on the recognized surface. The augmented reality applying unit 173 stores the augmented reality application image in the memory 160, and informs the screen output unit 175 that the augmented reality application image is prepared.

In addition, the augmented reality applying unit 173 may determine whether the virtual object may be arranged on the recognized surface. The augmented reality applying unit 173 may determine whether the recognized surface has a minimum area capable of projecting or receiving the virtual object thereon. That is, the augmented reality applying unit 173 may determine an area or a shape to determine whether the virtual object may be arranged on the recognized surface. In the meantime, if the recognized surface does not have the minimum area or a suitable shape to accommodate the virtual object, the augmented reality applying unit 173 determines that the virtual object may not be arranged on the recognized surface and may request a change of the virtual object to the virtual object image manager 171 such that the virtual object may be modified to be arranged on the recognized surface.

The screen output unit 175 generally controls the display unit 140 to output a corresponding execution screen as a user function is performed. Particularly, the screen output unit 175 according to the embodiment of the present invention controls the display unit 140 to output the augmented reality application image such that the virtual object is arranged and displayed on a surface of a subject according to an augmented reality request. That is, when receiving a signal indicating that the augmented reality application image is completed from the augmented reality applying unit 173, the screen output unit 175 accesses the memory 160 to support such that the augmented reality application image is displayed.

Figure 3:
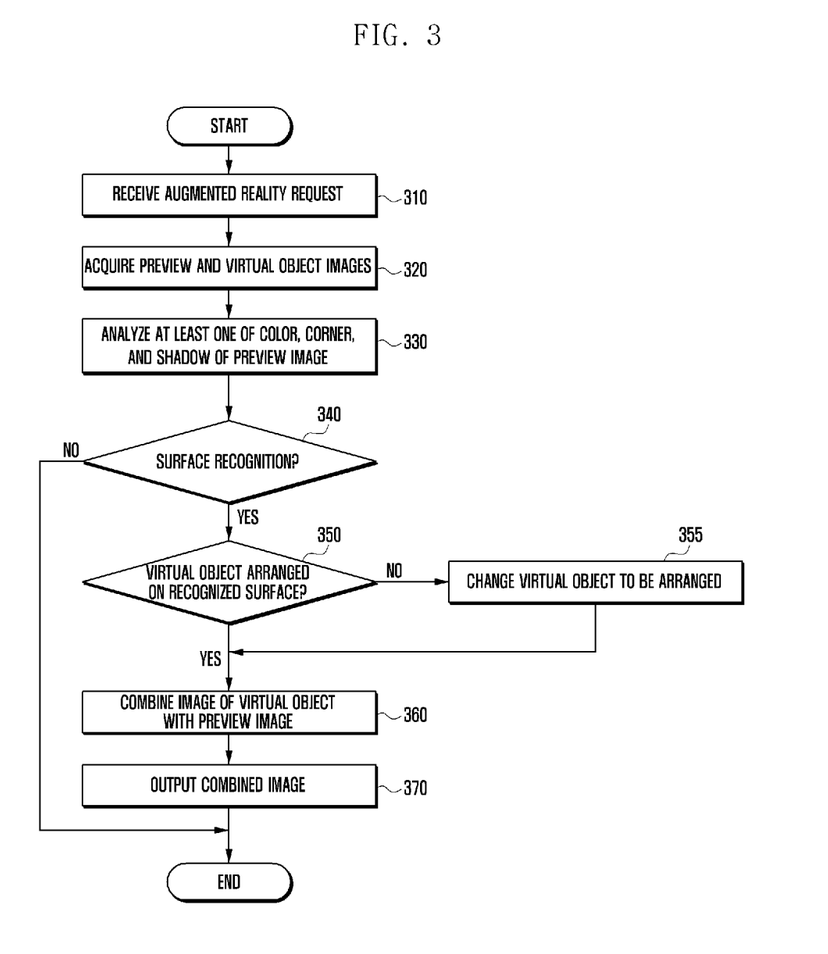
FIG. 3 is a flowchart illustrating a method of providing augmented reality according to an exemplary embodiment of the present invention.

FIG. 3 is a flowchart illustrating a method of providing augmented reality according to an exemplary embodiment of the present invention. Hereinafter, the present invention will be made for convenience of a description on the assumption that augmented reality is provided to a preview image provided in a camera photographing mode by way of example. Accordingly, the preview image corresponds to the augmented reality target image, however, persons of ordinary skill in the art will appreciate that the present invention is applicable to the preview image as well as a photographed image.

Referring to FIG. 3, a controller 170 receives an augmented reality request (310). The augmented reality request may be received through the input unit 120 from the user or may be generated when a specific event such as an alarm event or a notification event occurs. When such an event occurs, the controller 170 accesses the memory 160 to acquire a preview image and a virtual object image (320). The virtual object image may be previously selected by the user or may be preset according to a specific event.

The controller 170 may analyze at least one of a color, a edge, and a shadow of a preview image (330) and attempts to recognize at least one surface capable of arranging the virtual object image thereon (340).

For instance, the controller 170 may scan the preview image to determine a color composition of the preview image. In this case, the controller 170 may determine the color composition of the preview image by color analysis units, which may be a macro-block or pixel unit. Next, the controller 170 may determine a predetermined region having one color. In this case, the controller 170 may determine various colors having predetermined brightness within a specific range. In the embodiment, the controller 170 may recognize a region configured by the same color as a surface for arranging a virtual object.

The controller 170 may also detect edges from the preview image. If there is a closed region divided by the edges, the controller 170 may recognize a surface defined by the closed region as a surface for arranging the virtual object.

The controller 170 may further determine a shadow region from the preview image and recognize a surface capable of arranging the virtual object using the shadow region information. For example, the controller 170 may determine the brightness levels of the preview image by a brightness analysis unit to detect a shadow region. The brightness analysis unit may be a macro-block or pixel unit. In addition, the controller 170 may determine a region having a low brightness level (namely, dark grey level) and determines whether the region having a low brightness level has a predetermined shape in order to detect the shadow region. If the shadow region is determined, the controller 170 may recognize a surface capable of arranging the virtual object using a boundary with a surface contacting with the shadow region.

In alternate embodiment, the controller 170 may analyze the preview image using a combination of the foregoing surface recognition schemes. For example, the controller 170 may extract edges and recognize a surface capable of arranging the virtual object using a color variation. The controller 170 may detect the shadow region and determine edges associated with the shadow.

Conversely, if the surface is not recognized at step 340, the controller 170 terminates the process of providing the augmented reality. Alternatively, the controller 170 may control such the virtual object is displayed on a specific point within the display unit as dictated by the user or by a default scheme.

If the surface capable of arranging the virtual object is recognized (340), the controller 170 further determines whether the virtual object may be arranged on the recognized surface (350). Here, the controller 170 may determine whether the virtual object may be arranged on the recognized surface. For example, when the size of the recognized surface is equal to or greater than the size of the virtual object, the controller 170 determines that the virtual object may be arranged on the recognized surface and goes to step 360.

If a plurality of surfaces adequate enough to display the virtual object are recognized at step 340, the controller 170 compares areas or shapes of the recognized surfaces (350). Here, the controller 170 selects a surface having the greatest area or a surface in which the virtual object can be stably arranged when determining whether the virtual object may be arranged.

It is determined that the virtual object may not be arranged on the recognized surface, the controller 170 changes or modifies the virtual object to be arranged on the recognized surface (355). To this end, the controller 170 may reduce, rotate, and cut the virtual object to be arranged on an area of the recognized surface. The controller 170 may also add another virtual object (e.g. a speech bubble) along with the modified virtual object. Accordingly, the controller 170 may adjust the size of the virtual object. According to the change, the virtual object is changed to have a limited contact surface, line or point. In this way, the virtual object can be arranged on the recognized surface.

Thereafter, the controller 170 combines an image of the virtual object with the preview image to generate a combined image so that the virtual object is arranged and displayed on the recognized surface (360). After that, the controller 170 outputs the combined image (370) and terminates the procedure of providing the augmented reality.

Hereinafter, a method of recognizing various surfaces in a specific image, for example, a preview image and various virtual object images will be described with reference to FIGS. 4 and 5. The following description will be made assumption that an augmented reality request is received during an output of the preview image, and augmented reality is provided to the preview image for illustrative purposes.

Figure 4:
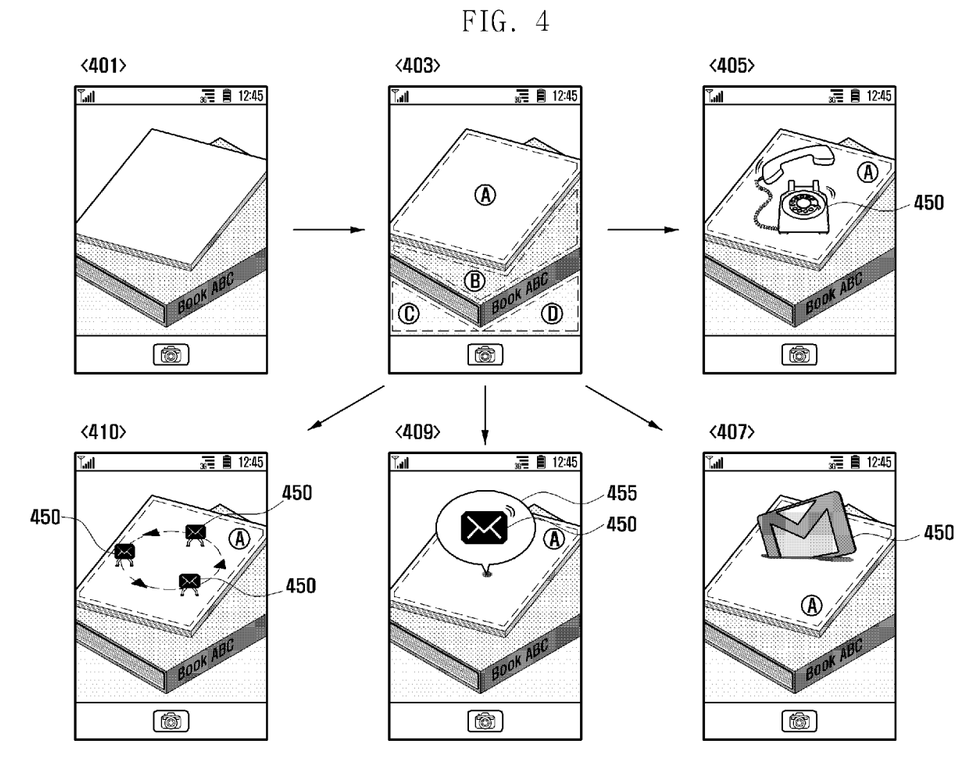
FIG. 4 illustrates a process of providing augmented reality according to an exemplary embodiment of the present invention.

FIG. 4 illustrates the operations of providing augmented reality according to an exemplary embodiment of the present invention.

Referring to FIG. 4, a controller 170 controls the display unit 140 to output a preview image during a camera photographing mode, as illustrated in screen 401. The controller 170 may receive the augmented reality request from a user. Alternatively, the augmented reality request may be a type of an alarm event or notification event received in response to receiving an incoming message, call or email. Accordingly, the controller 170 may support a type of notification function using the augmented reality. If an alarm or notification event such as messages, phone call, and schedules occurs in the terminal 100 during the image photographing mode, the controller 170 may provide augmented reality associated with a currently executed function.

In response to the augmented reality request described above, the controller 170 may analyze at least one of a color, edges, and a shadow of the preview image to detect a plurality of surfaces, for example, a surface 'A', a surface 'B', a surface 'C', and a surface 'D', as illustrated in screen 403. For instance, the controller 170 may analyze the color of each surface from the preview image. In the embodiment, the controller 170 may recognize a predetermined region having the same color within the region as one surface. In addition, the controller 170 may further recognize patterns indicative of edges from the detected surface by color analysis and then recognize the surface. That is, the controller 170 may analyze an image to detect an edge from the preview image. Accordingly, the controller 170 determines an edge of the subject, and then recognizes a region divided by the edge as a possible surface for arranging and displaying the virtual object thereon.

Next, the controller 170 may determine whether a virtual object, for example, a surface area large enough to display the 'phone 450' image is included in the detected surfaces. Here, the controller 170 may consider an area or a shape of the detected surface. The controller 170 may determine that a surface 'A' of the detected surfaces has the largest area and a size and shape capable of displaying the 'phone 450' image. As described above, after determining a surface which the virtual object may be arranged, the controller 170 may combine an image of 'phone 450' with the preview image and output the combined image on the display unit 140 as illustrated in screen 405. In this case, the controller 170 may combine two images such that augmented reality as 'phone 450' is arranged on the recognized surface 'A' is provided.

Meanwhile, the virtual object may have various forms in addition to the 'phone 450' image shown in a screen 405. The controller 170 may change the virtual object such that the virtual object may be arranged on a surface according to an area of the recognized surface. In this case, the controller 170 may change the virtual object to various shapes and/or sizes as described hereinafter.

If it is determined that the recognized surface has an inappropriate size and not adequate enough for receiving the virtual object, the controller 170 may rotate and cut a portion of the virtual object, that is, 'letter envelope 450' and then displays the cut portion of the virtual object as a line, as illustrated in screen 407. Accordingly, the controller 170 may arrange the 'letter envelope 450' on the recognized surface 'A' and provide the augmented reality as the 'letter envelope 450' being inserted on a book. Alternatively, the controller 170 may combine the 'letter envelope 450' with another virtual object such as speech bubble 455 to arrange and display the combined result on a predetermined point of the surface 'A', as illustrated in screen 409.

In yet another alternate embodiment, the controller 170 may provide augmented reality as movable virtual object. For example, the controller 170 control the display to animate the letter envelope 450 to move in a circular pattern on the recognized surface 'A', as illustrated in screen 410.

As explained above, after detecting at least one surface from a preview image defined by one of a color likeness, edges, and a show region, various forms of a virtual image can be varied and/or fitted to be displayed on the detected surface.

Figure 5:
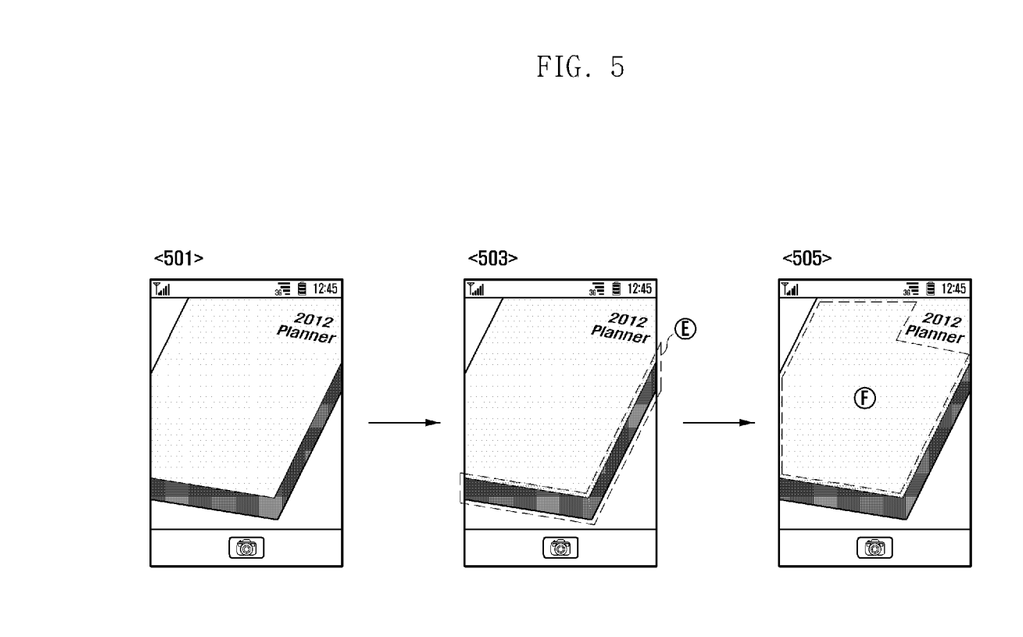
FIG. 5 illustrates a process of providing augmented reality according to another exemplary embodiment of the present invention.

FIG. 5 is an exemplary diagram illustrating a screen of providing augmented reality according to another exemplary embodiment of the present invention.

Referring to FIG. 5, a controller 170 controls the display unit 140 to display a preview image as illustrated in screen 501. While the preview image is being outputted, the controller 170 may receive an augmented reality request and in response, analyze a shadow 'E' of the preview image as illustrated in screen 503. In this case, the controller 170 may recognize the grey shadow region 'E' based on the darkness level from the preview image. Alternatively, the controller 170 may analyze the shadow 'E' of the preview image using an illumination sensor. After determining that the shadow 'E', the controller 170 may determine a profile of the shadow 'E'. Thereafter, the controller 170 recognizes the boundary defined by the shadow 'E' to determine a surface 'F' contacting the boundary which may be used to display a virtual object. Alternatively, the controller 170 may analyze the color brightness defined by the shadow region 'E' or edges defined by the profile of the shadow 'E' to recognize the surface 'F' onto which a virtual object can be displayed.

As described above, the present invention may recognize a surface of a subject from a specific image, for example, preview image and then display a virtual object on the recognized real surface, thus providing a more augmented reality experience that is more stimulating and realistic manner.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method performed by an electronic device, of providing augmented reality, the method comprising:
   displaying a specific image during a preview image mode;
   in response to detecting an event, providing a virtual object indicative of the event, wherein the event is one of an incoming communication event, an alarm event of a state of the electronic device, or a schedule notification event;
   recognizing, by a controller of the electronic device, at least one surface from the specific image for displaying the virtual object thereon according to a predetermined criteria;
   determining whether the virtual object is able to be fit within the at least one surface by comparing a size of the at least one surface with a size of the virtual object; and
   displaying the virtual object on a limited contact surface, a line, or a point of the at least one surface by adjusting the size of the virtual object when the virtual object is unable to fit within the at least one surface,
   wherein the virtual object is provided responsive to the incoming communication event, and the virtual object is displayed in a form resembling a type of the incoming communication event.

2. The method of claim 1, wherein the recognizing of the at least one surface comprises analyzing at least one of a color, edges, and a shadow from the specific image.

3. The method of claim 2, wherein the recognizing of the at least one surface comprises determining a region having one color.

4. The method of claim 3, wherein the determining of the region comprises recognizing the determined region having the one color as the at least one surface.

5. The method of claim 3, further comprising searching edges from the region to recognize a closed region defined by the edges as the at least one surface.

6. The method of claim 3, wherein the region has a predetermined brightness difference.

7. The method of claim 2, wherein the recognizing of the at least one surface comprises recognizing a region divided by the edges as the at least one surface.

8. The method of claim 2, wherein the recognizing of the at least one surface comprises recognizing the at least one surface using a shadow boundary detected thereon.

9. The method of claim 1, wherein the incoming communication event is a telephone call and the virtual object has the form of a phone.

10. The method of claim 1, wherein the incoming communication event is a message, the virtual object is expressed by a 2D or 3D image and is displayed in the form of an envelope.

11. An electronic device for supporting augmented reality, the electronic device comprising:
- a display unit displaying a specific image during a preview image mode; and
- a controller configured to:
  - in response to detecting an event, provide a virtual object indicative of the event, wherein the event is one of an incoming communication event, an alarm event of a state of the electronic device, or a schedule notification event,
  - recognize at least one surface from the specific image according to a predetermined criteria,
  - determine whether a virtual object is able to be fit within the at least one surface by comparing a size of the at least one surface with a size of the virtual object; and
  - present, via the display unit, the virtual object on a limited contact surface, a line, or a point of the at least one surface by adjusting the size of the virtual object when the virtual object is unable to fit within the at least one surface,
- wherein the virtual object is provided responsive to the incoming communication event, and the virtual object is displayed in a form resembling a type of the incoming communication event.

12. The electronic device of claim 11, wherein the controller analyzes at least one of a color, edges, and a shadow from the specific image to recognize the at least one surface.

13. The electronic device of claim 12, wherein the controller determine a region having one color from the specific image as the at least one surface.

14. The electronic device of claim 13, wherein the region having the one color has a predetermined brightness difference.

15. The electronic device of claim 12, the controller recognizes a region defined by the edges in the specific image as the at least one surface.

16. The electronic device of claim 12, wherein the controller recognizes the at least one surface using a shadow boundary.

17. The electronic device of claim 11, wherein the controller adjusts, enlarges, 2D-rotates, 3D-rotates, or cuts the virtual object, or adds the virtual object to another virtual object according to an area or a size of the recognized at least one surface so that the virtual object is displayed within the at least one surface.

18. The electronic device of claim 11, further comprising a camera photographing a subject to generate the specific image.

19. The electronic device of claim 11, wherein the virtual object is provided responsive to the incoming communication event, the virtual object being displayed in a form representing a type of the incoming communication event and displayed on the limited contact surface in an animated pattern.

* * * * *